United States Patent
Geddes et al.

(10) Patent No.: US 12,354,199 B1
(45) Date of Patent: Jul. 8, 2025

(54) REMOTE GESTURE CONTROL

(71) Applicant: Zoom Communications, Inc., San Jose, CA (US)

(72) Inventors: Graeme Lambourne Geddes, Aliso Viejo, CA (US); Shawn Michael Rolin, San Jose, CA (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 18/351,126

(22) Filed: Jul. 12, 2023

Related U.S. Application Data (63) Continuation of application No. 17/942,801, filed on Sep. 12, 2022, now abandoned.

(51) Int. Cl.
| | |
|---|---|
| *G06T 13/40* | (2011.01) |
| *G06F 3/01* | (2006.01) |
| *G06T 17/20* | (2006.01) |

(52) U.S. Cl.
CPC .............. *G06T 13/40* (2013.01); *G06F 3/012* (2013.01); *G06F 3/017* (2013.01); *G06T 17/20* (2013.01)

(58) Field of Classification Search
CPC ......... G06T 13/40; G06T 17/20; G06F 3/012; G06F 3/017
See application file for complete search history.

(56) References Cited

U.S. PATENT DOCUMENTS

| | | | |
|---|---|---|---|
| 2019/0222807 A1* | 7/2019 | Rivard | G06T 13/40 |
| 2022/0124283 A1* | 4/2022 | Krol | G06T 13/40 |
| 2024/0221270 A1* | 7/2024 | Leyton | G06T 13/40 |

* cited by examiner

*Primary Examiner* — Junior O Mendoza
*Assistant Examiner* — Alexander Boyd
(74) *Attorney, Agent, or Firm* — Young Basile Hanlon & MacFarlane, P.C.

(57) ABSTRACT

An Avatar Engine triggers transmission of an instance of a three-dimensional (3D) mesh model to a target computer device associated with a first user account. The Avatar Engine detects changes in a video stream captured at a source computer device associated with a second user account, the second user account represented by a digital avatar rendered at the target computer device according to the instance of the 3D mesh model received by the target computer device. The Avatar Engine identifies a command based on the detected changes in the video stream captured at the source computer device, the at least one command corresponding to a portion of blendshapes. The Avatar Engine triggers transmission of the identified command to the target computer device associated with the first user account, the target computer device generating a local instantiation of the digital avatar rendered according to the 3D mesh model and the blendshapes.

20 Claims, 11 Drawing Sheets

REMOTE GESTURE CONTROL

CROSS-REFERENCE TO RELATED APPLICATION(S)

This application is a continuation of U.S. patent application Ser. No. 17/942,801, filed Sep. 12, 2022, the entire disclosure of which is hereby incorporated by reference.

FIELD

Various embodiments relate generally to digital communication, and more particularly, to online video and audio.

SUMMARY

The appended Abstract may serve as a summary of this application.

BRIEF DESCRIPTION OF THE DRAWINGS

The present disclosure will become better understood from the detailed description and the drawings, wherein.

DETAILED DESCRIPTION

Various embodiments of a Avatar Engine are described herein that provide functionality for locally rendering and displaying, at a target computer device associated with a first user account, a digital avatar associated with a second user account according to one or more command's sent from a source computer device to the target computer device. In some embodiments, the commands sent to the target computer device may correspond to blendshapes identified based on detected changes in a video stream captured at the source computer device.

In one or more embodiments, a video stream captured at the source computer device includes the portrayal of various changes in facial expressions and/or gestures of an individual physically positioned proximate to a camera of the source computer device. The source computer device is associated with the second user account. The second user account has selected the digital avatar to represent the second user account's online presence in place of sending the video stream captured at the source computer device. For example, when participating in an online virtual meeting, the second user account may elect that the digital avatar be displayed to other user accounts accessing the virtual meeting in place of transmitting the live video stream captured at the source computer device.

In one or more embodiments, a mesh model for the digital avatar is sent to a target computer device(s). As such, the mesh model is locally stored at the target computer device(s). While the first and second user accounts are both participating in an online virtual meeting, the camera of the source computer device continually captures the video stream (or video feed). The Avatar Engine detects various types of facial expressions and/or various types of changes of facial expressions in the video stream (or video feed). The Avatar Engine generates and/or identifies one or more commands based on the detected facial expressions/gestures and/or facial expression/gesture changes. The Avatar Engine triggers transmission of the commands from the source computer device to the target computer device. The target computer device receives the commands and implements the commands via the locally stored mesh model. For example, the one or more commands may be applied at the target computer device via the local mesh model to render and/or update a local instantiation of the second user account's digital avatar at the target computer device.

It is understood that a portion(s) and/or one or more modules of the Avatar Engine may be stored and implemented at the source computer device. A portion(s) and/or one or more modules of the Avatar Engine may be stored and implemented at the target computer device(s). A portion(s) and/or one or more modules of the Avatar Engine may be stored and implemented at a cloud computing system. For example, the cloud computing system may be a communication platform or part of a communication platform. In some embodiments, the portions and/or modules respectively implemented at the source computer device, the target computer device(s) and the cloud computing system may communicate with each other.

In this specification, reference is made in detail to specific embodiments of the invention. Some of the embodiments or their aspects are illustrated in the drawings. The embodiments described herein may require authorization of an account administrator prior to use.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the invention. The invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

Figure 1A:
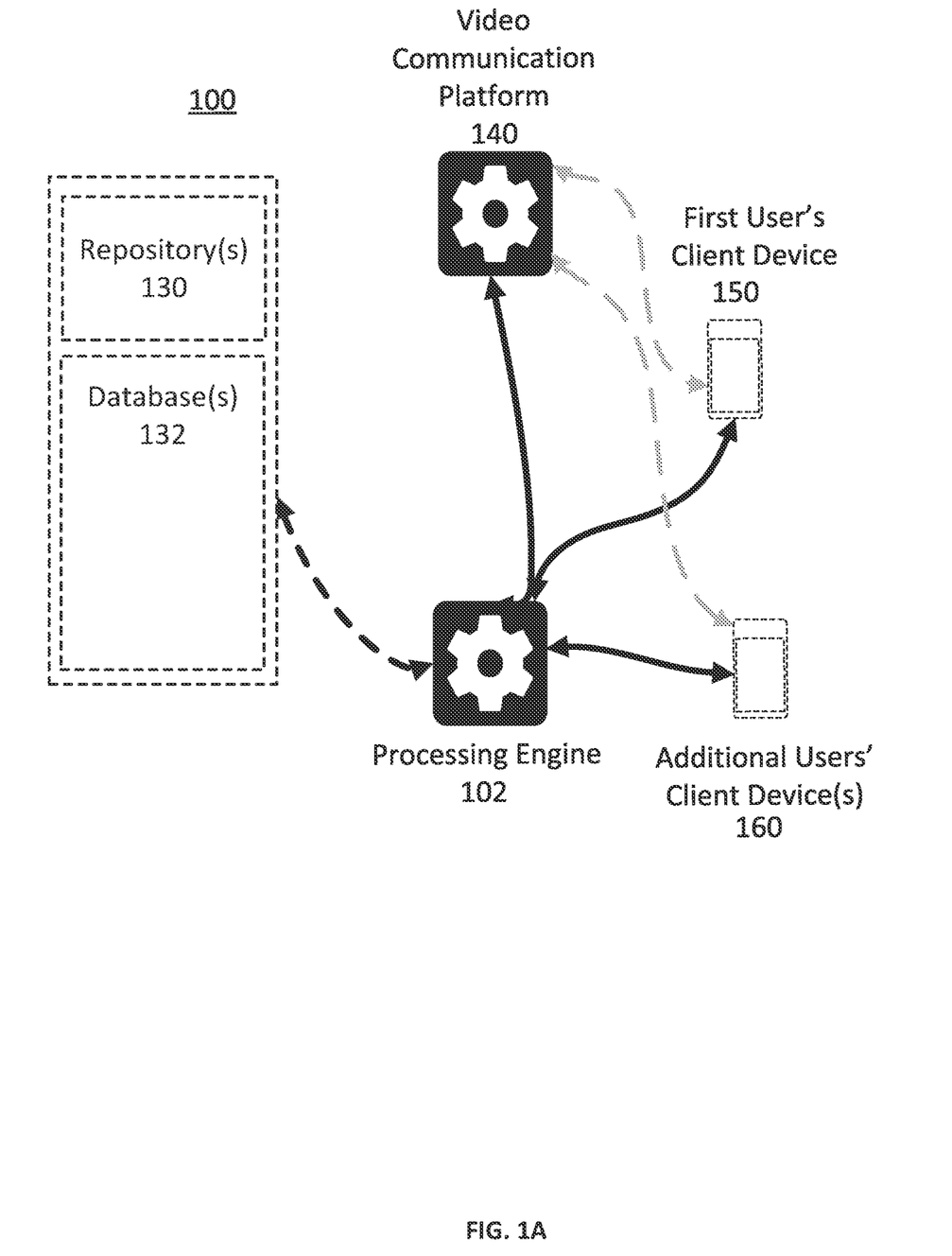
FIG. 1A is a diagram illustrating an exemplary environment in which some embodiments may operate.

FIG. 1A is a diagram illustrating an exemplary environment in which some embodiments may operate. In the exemplary environment I 00, a sending client device 150, one or more receiving client device(s) 160 are connected to a processing engine 102 and, optionally, a communication platform 140. The processing engine 102 is connected to the communication platform 140, and optionally connected to one or more repositories 130 and/or databases 132 of historical virtual online event data, such as historical virtual meeting data One or more of the databases may be combined or split into multiple databases. The sending client device 150 and receiving client device(s) 160 in this environment may be computers, and the communication platform server 140 and processing engine 102 may be applications or software hosted on a computer or multiple computers which are communicatively coupled via remote server or locally.

The exemplary environment 100 is illustrated with only one sending client device, one receiving client device, one processing engine, and one communication platform, though in practice there may be more or fewer sending client devices, receiving client devices, processing engines, and/or communication platforms. In some embodiments, the sending client device, receiving client device, processing engine, and/or communication platform may be part of the same computer or device.

In an embodiment(s), the processing engine 102 may perform methods 500,600 (of FIGS. 5, 6) or other method herein. In some embodiments, this may be accomplished via communication with the sending client device, receiving client device(s), processing engine 102, communication platform 140, and/or other device(s) over a network between the device(s) and an application server or some other network server. In some embodiments, the processing engine 102 is an application, browser extension, or other piece of software hosted on a computer or similar device or is itself a computer or similar device configured to host an application, browser extension, or other piece of software to perform some of the methods and embodiments herein.

Sending client device 150 and receiving client device(s) 160 are devices with a display configured to present information to a user of the device. In some embodiments, the sending client device 150 and receiving client device(s) 160 present information in the form of a user interface (UI) with UI elements or components. In some embodiments, the sending client device 150 and receiving client device(s) 160 send and receive signals and/or information to the processing engine 102 and/or communication platform 140. The sending client device 150 is configured to submit messages (i.e., chat messages, content, files, documents, media, or other forms of information or data) to one or more receiving client device(s) 160. The receiving client device(s) 160 are configured to provide access to such messages to permitted users within an expiration time window. In some embodiments, sending client device 150 and receiving client device(s) are computer devices capable of hosting and executing one or more applications or other programs capable of sending and/or receiving information. In some embodiments, the sending client device 150 and/or receiving client device(s) 160 may be a computer desktop or laptop, mobile phone, virtual assistant, virtual reality or augmented reality device, wearable, or any other suitable device capable of sending and receiving information. In some embodiments, the processing engine 102 and/or communication platform 140 may be hosted in whole or in part as an application or web service executed on the sending client device 150 and/or receiving client device(s) 160. In some embodiments, one or more of the communication platform 140, processing engine 102, and sending client device 150 or receiving client device 160 may be the same device. In some embodiments, the sending client device 150 is associated with a sending user account, and the receiving client device (s) 160 are associated with receiving user account(s).

In some embodiments, optional repositories function to store and/or maintain, respectively, user account information associated with the communication platform 140, conversations between two or more user accounts of the communication platform 140, and sensitive messages (which may include sensitive documents, media, or files) which are contained via the processing engine 102. The optional repositories may also store and/or maintain any other suitable information for the processing engine 102 or communication platform 140 to perform elements of the methods and systems herein. In some embodiments, the optional database(s) can be queried by one or more components of system 100 (e.g., by the processing engine 102), and specific stored data in the database(s) can be retrieved.

Communication platform 140 is a platform configured to facilitate communication between two or more parties, such as within a conversation, "chat" (i.e., a chat room or series of public or private chat messages), video conference or meeting, message board or forum, virtual meeting, or other form of digital communication. In some embodiments, the platform 140 may further be associated with a video communication environment and a video communication environment client application executed on one or more computer systems.

Figure 1B:
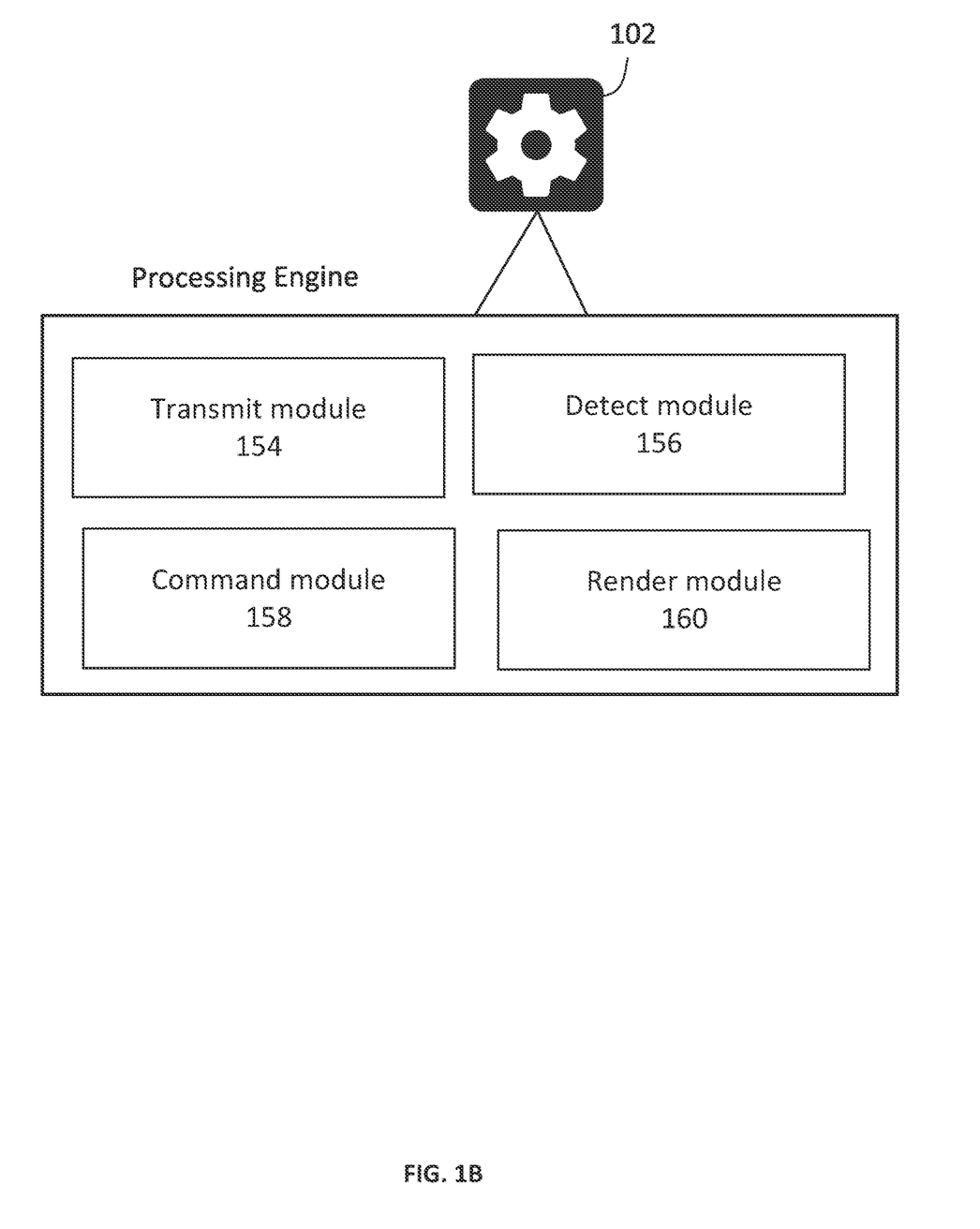
FIG. 1B is a diagram illustrating an exemplary environment in which some embodiments may operate.

FIG. 1B is a diagram illustrating exemplary software modules 154, 156, 158, 160 of a Avatar Engine that may execute at least some of the functionality described herein. According to some embodiments, one or more of exemplary software modules 154, 156, 158, 160 may be part of the processing engine 102. In some embodiments, one or more of the exemplary software modules 154, 156, 158, 160 may be distributed throughout the communication platform 140.

The transmit module 154 functions to trigger transmit (and/or transmit) instances of a 3D mesh model and commands.

The detect module 156 functions to capture a video stream(s) and detect changes in a video stream(s).

The command module 158 functions to identify and/or generate commands based on detected changes in a video stream(s)

The render module 160 functions to receive and locally store an instance of a 3D mesh model and to further render a local instantiation of a digital avatar.

The above modules 154, 156, 158, 160 and their functions will be described in further detail in relation to FIGS. 3, 4A, 4B, 5A, 5B, 6A and 6B. In various embodiments, the above modules 154, 156, 158, 160 may be respectively distributed amongst a source computer device, a target computer device(s) and/or a cloud computer system.

Figure 2:
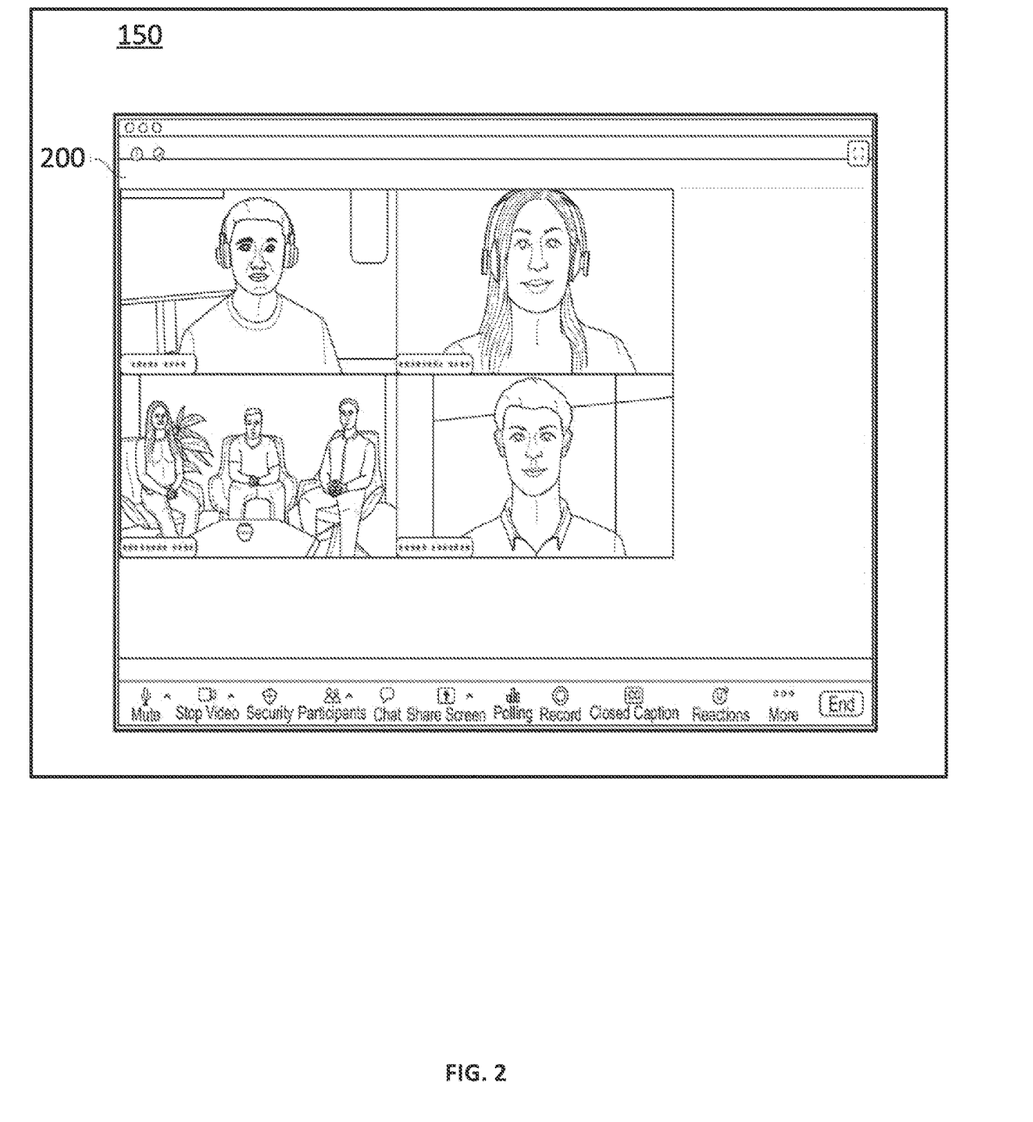
FIG. 2 is a diagram illustrating an exemplary environment in which some embodiments may operate.

As shown in the example of FIG. 2, a user account communications interface 200 for accessing and communicating with the platform 140 and displayed at a computer device 150. The interface 200 provides access to video data, audio data, chat data and meeting transcription related to an online event(s), such as a virtual webinar or a virtual meeting joined by a user account associated with the computer device 150. The interface 200 further provides various types of tools, functionalities, and settings that can be selected by a user account during an online event. Various types of virtual meeting control tools, functionalities, and settings are, for example, mute/unmute audio, turn on/off video, start meeting, join meeting, view and call contacts.

Figure 3:
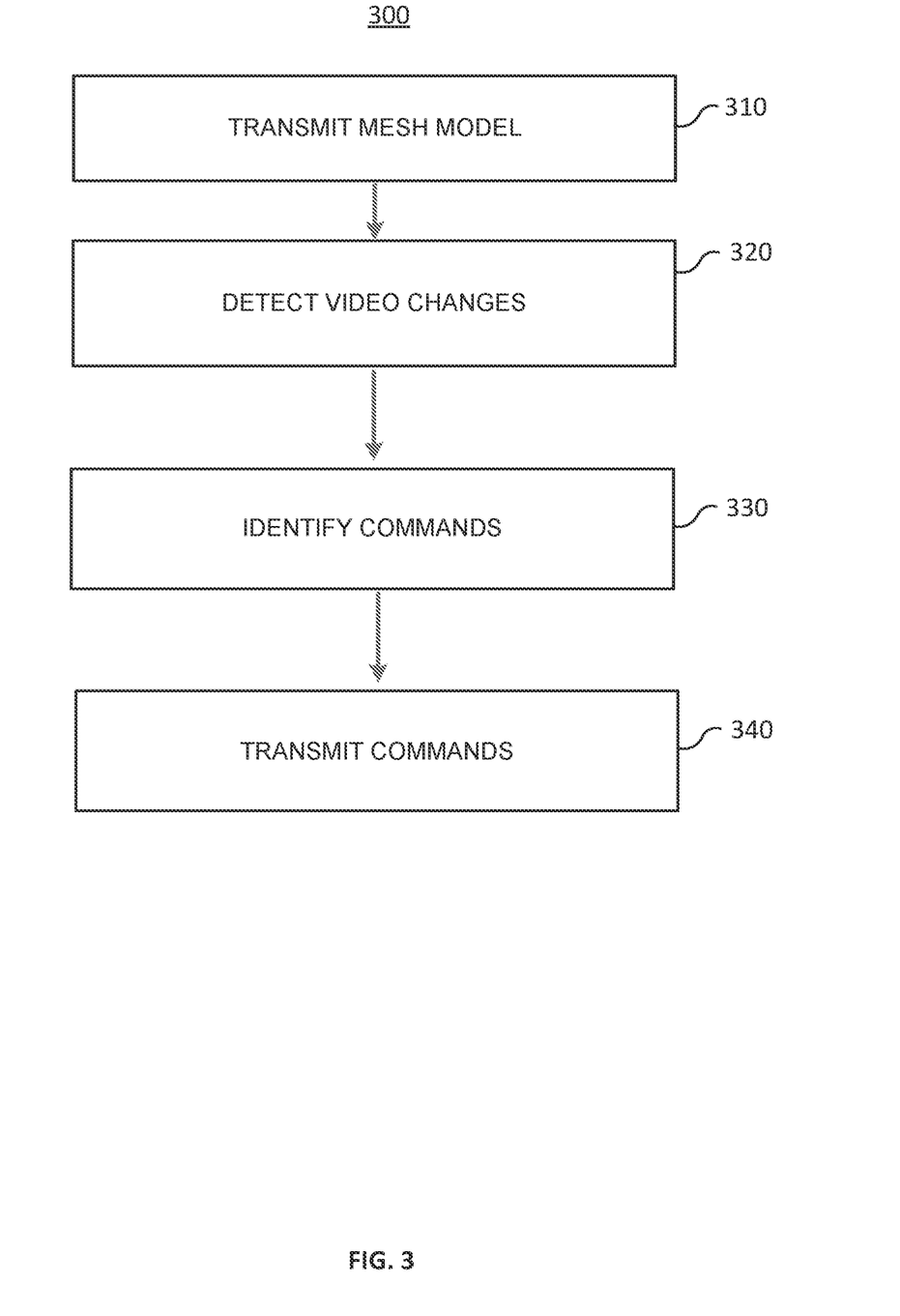
FIG. 3 is a diagram illustrating an exemplary flowchart according to some embodiments.

As shown in flowchart diagram 300 of the example of FIG. 3, the Avatar Engine triggers transmission of an instance of a three-dimensional (3D) mesh model to a target computer device associated with a first user account. (Act 310) The 3D mesh model may be a digital avatar model. In some embodiments, the Avatar Engine triggers transmission of the instance of the 3D mesh model to the target computer device based on an action by the first user account with respect to an online virtual meeting. For example, the action may be the first user account accepting an invitation to an upcoming online virtual meeting and/or requesting access to an online virtual meeting. The Avatar Engine may trigger transmission of the instance of the three-dimensional (3D) mesh model to a target computer device such that that instance is sent from the source computer device or sent from a cloud-based computer system. For example, the cloud-based computer system may be a multimedia router transmission module hosted in the cloud-based computer system.

In other embodiments, the Avatar Engine triggers transmission of the instance of the three-dimensional (3D) mesh model in response to detecting a disruption of video stream capture at the source compute device. For example, the source computer device may be transmitting the video stream to respective participant user accounts of an online virtual meeting. During transmission of the video stream, the Avatar Engine detects certain metrics and/or attributes of video quality and/or bandwidth that fail to meet a satisfactory threshold. Based on failing to meet the satisfactory threshold, the Avatar Engine triggers transmission of an instance of the three-dimensional (3D) mesh model to each computer device associated with the respective participant user accounts. Each recipient computer device receives the instance and renders a local instantiation of the digital avatar. The Avatar Engine receives messages from each recipient computer device indicating local rendering of the digital avatar. As each message is received, the Avatar Engine ceases transmission of the disrupted video stream from the source computer device to the recipient computer device associated with that received message.

The Avatar Engine detects one or more changes in a video stream captured at a source computer device associated with a second user account, the second user account represented by a digital avatar rendered at the target computer device according to the instance of the 3D mesh model received by the target computer device. (Act 320)) In some embodiments, one or more video frames and/or image frames form the video stream may be pre-processed to identify a group of pixels depicting a head shape and/or optionally a shape of a body portion of an individual. For example, the individual may correspond to the second user account that is associated with the source computer device. The Avatar Engine evaluates the video/image frames (or the identified group of pixels). In some embodiments, the Avatar Engine evaluates the pixels through an inference process by utilizing machine learning network that has been trained to classify one or more facial expressions and the expression intensity in video/image frames.

The Avatar Engine determines facial expression values such as one or more action unit values with an associated action intensity value. In some embodiments, only an action unit value is determined. For example, an image of a user may depict that one or more movements of lips related to portrayal of a physical performance of laughter and/or a tilt the head as part as a series of tilts of the head related to portrayal of a physical performance of an affirmative head nod. The Avatar Engine (and/or the trained machine learning network) may output pairs of action unit values and corresponding intensity values. A first action unit value would indicate detection of lip movements closed and intensity values correspond to an extent of the detection lip movements (i.e., whereby a maximum lip movement may correspond to a full mouth open wide facial expression). A second action unit would indicate a head turned to the left, and the intensity value 0.5 would indicate pronounced action (i.e., head turned half-way to the left).

The Avatar Engine identifies at least one command based on the one or more detected changes in the video stream captured at the source computer device, the at least one command corresponding to at least a portion of one or more blendshapes. (Act 330) In some embodiments, the Avatar Engine applies the determined action unit value and corresponding intensity value pairs to three-dimensional (3D) mesh model. Blendshapes of the mesh model are then identified based on the determined action unit values. Commands are further identified and/or generated by the Avatar Engine based on the identified blendshapes. The Avatar Engine triggers transmission of the identified command to the target computer device associated with the first user account, the target computer device generating a local instantiation of the digital avatar rendered according to the 3D mesh model and the one or more blendshapes. (Act 340)

Figure 4A:
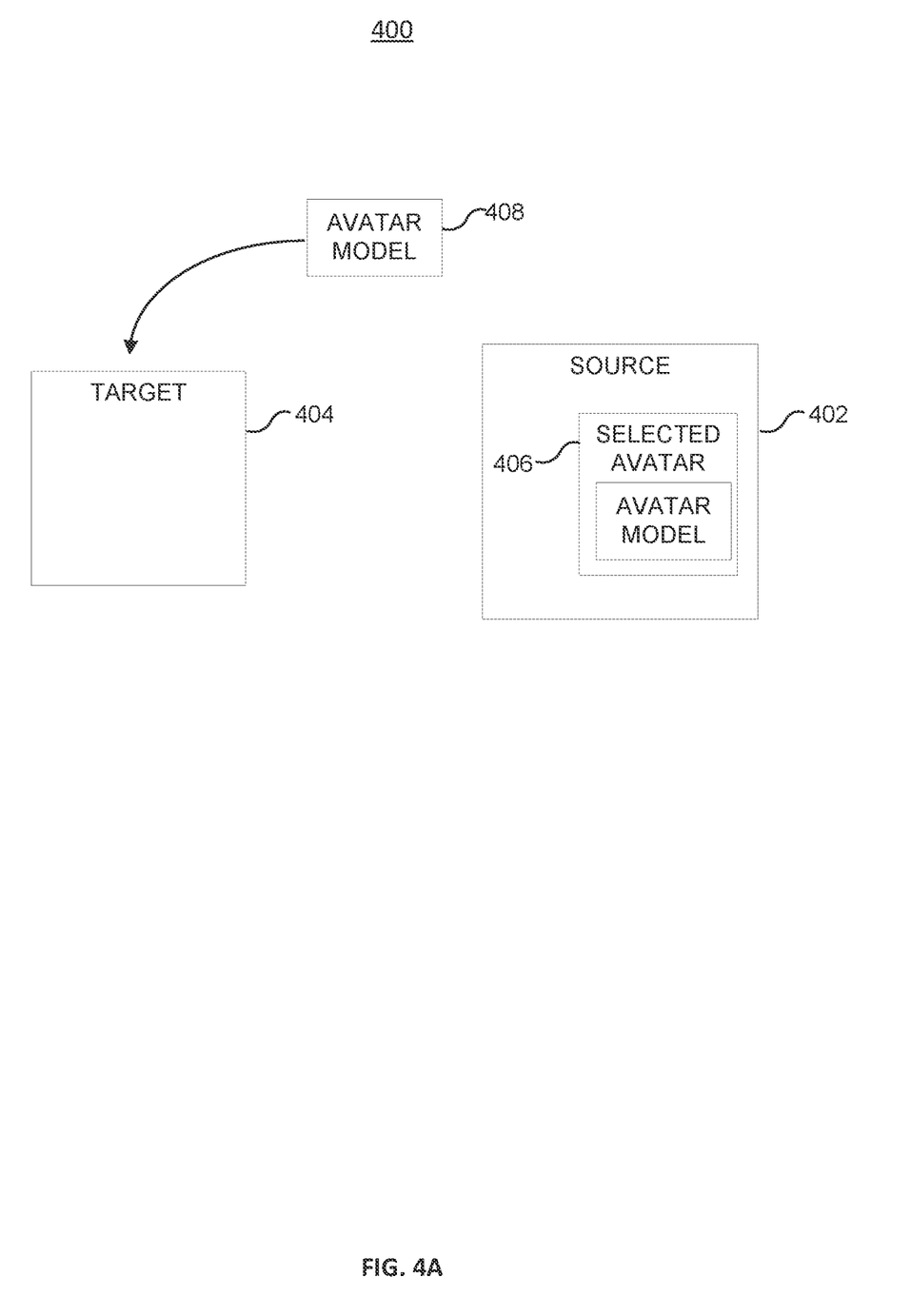
FIGS. 4A and 4B are each a diagram illustrating an exemplary environment in which some embodiments may operate.

As shown in diagram 400 of the example of FIG. 4A, the Avatar Engine triggers transmission of an instance 408 of a three-dimensional (3D) mesh model for a digital avatar 406 ("mesh model 406") to a target computer device 404 associated with a first user account.

Figure 4B:
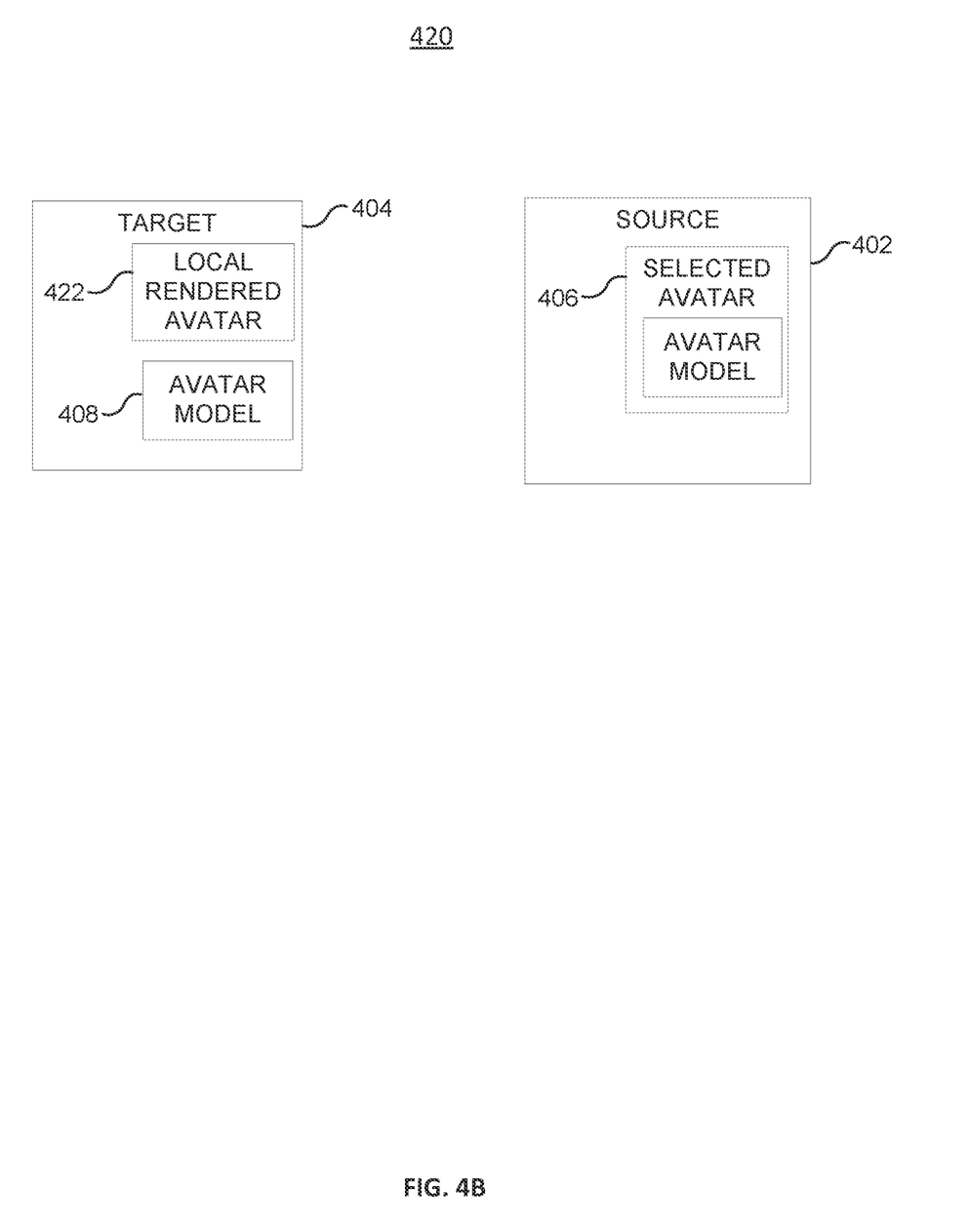

As shown in diagram 420 of the example of FIG. 4B, the target computer device 404 associated with the first user account receives the mesh model instance 408 for the digital avatar selected by the second user account. The target computer device 404 locally stores the mesh model 408. The first user account joins an online virtual meeting. The Avatar Engine determines whether the second user account is currently participating in the online virtual meeting. Based on the first and the second user accounts both currently accessing the online virtual meeting, the Avatar Engine instantiates a local rendering 422 of the digital avatar at the target computer device 404. In some embodiments, the Avatar Engine determines that the second user account is not yet currently participating in the online virtual meeting when the first user account joins the online virtual meeting. The Avatar Engine thereby instantiates the local rendering 422 of the digital avatar at the target computer device 404 upon detecting the second user account joining the online virtual meeting.

The Avatar Engine triggers transmission of a message to the source computer device 402 indicating that the target computer device 404 has locally rendered the digital avatar 422. Based on receipt of the message, the source computer device 402 identifies the target computer device 404 as a recipient of subsequent commands. As shown in diagram 500 of the example of FIG. 5A, the source computer device 402 captures a video stream 502 generated by a camera(s) of the source computer device 402.

Figure 5A:
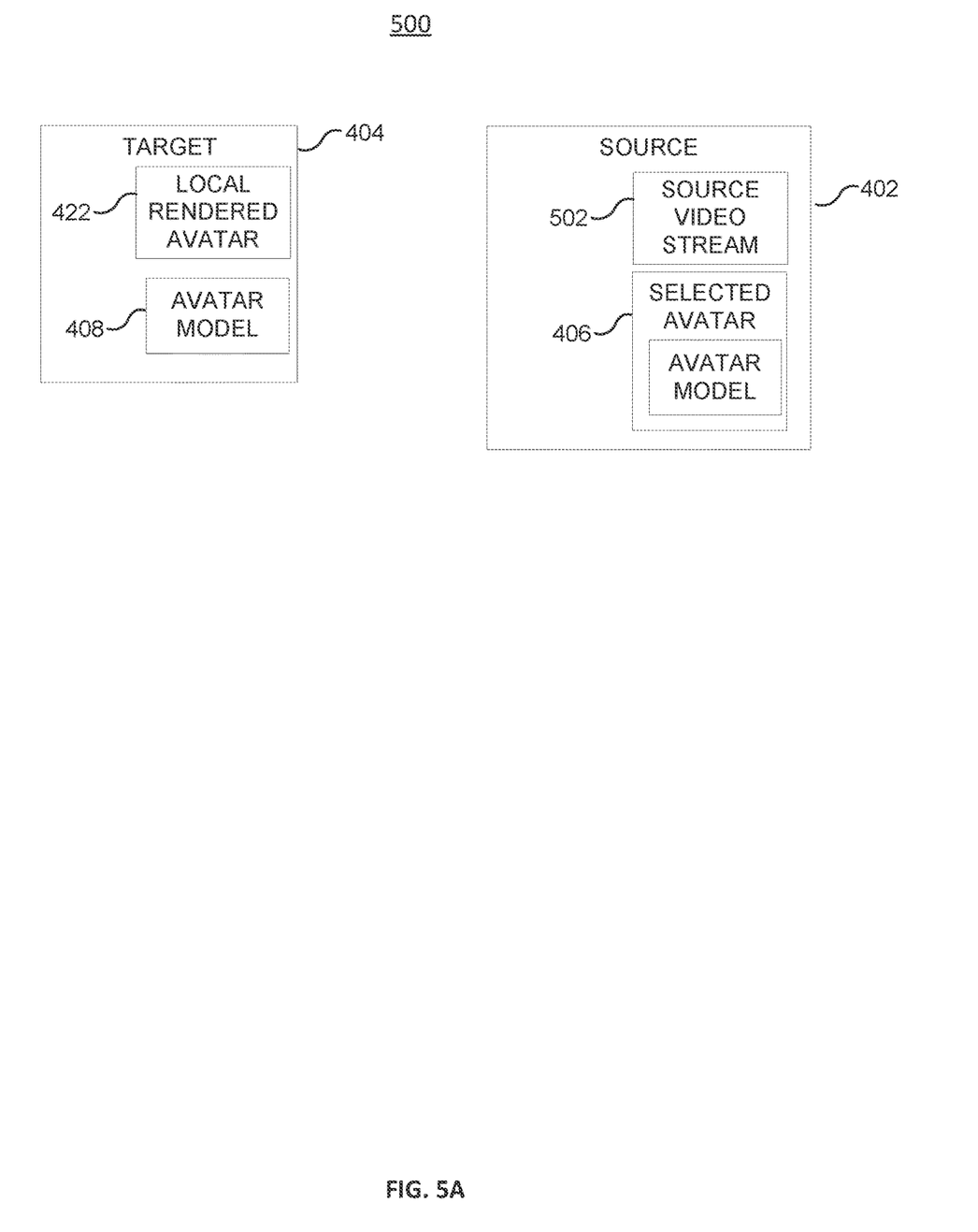
FIGS. 5A and 5B are each a diagram illustrating an exemplary environment in which some embodiments may operate.
Figure 5B:
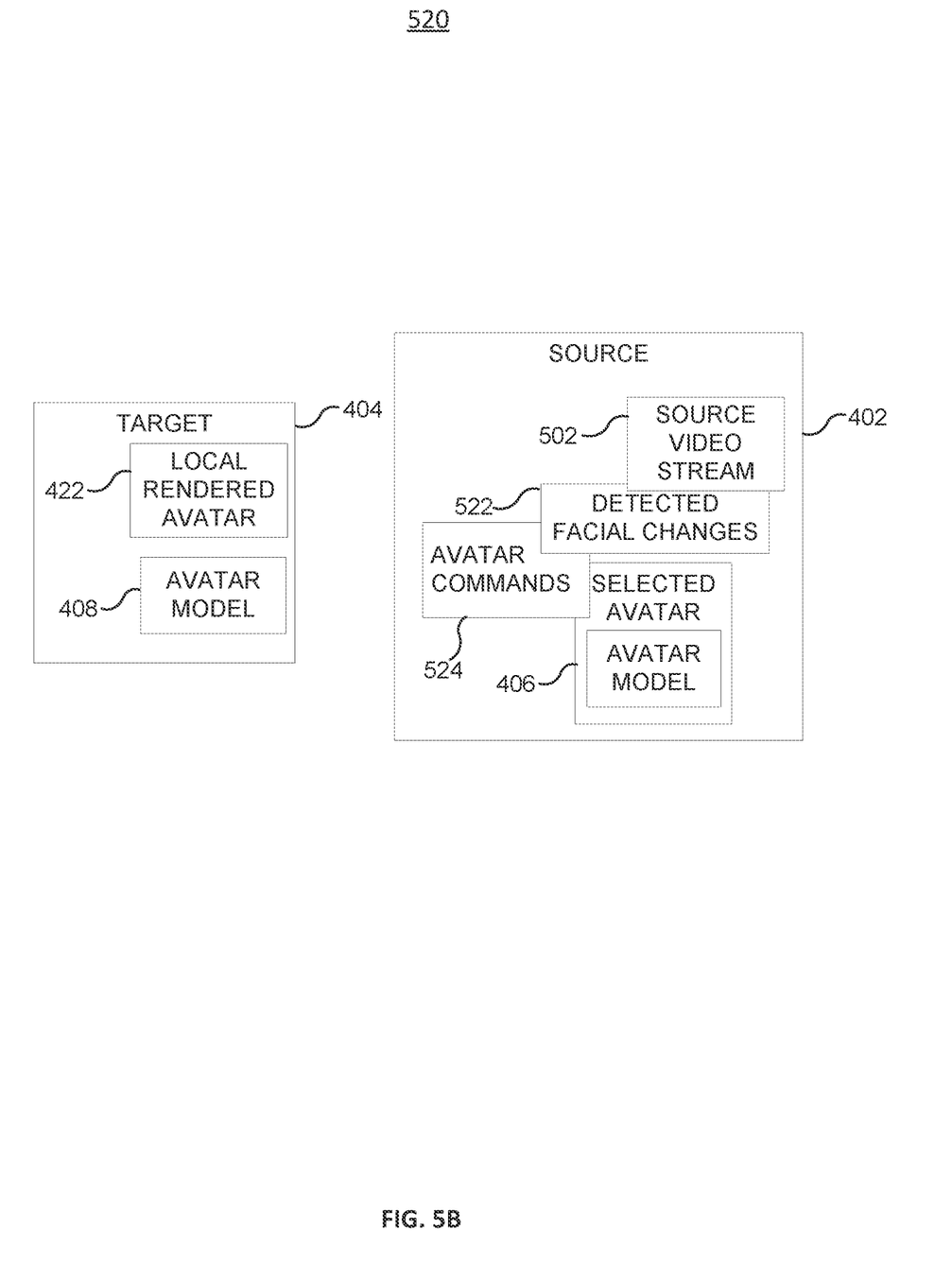

As shown in diagram 520 of the example of FIG. 5B, the Avatar Engine detects one or more changes 522 in various pixel regions in respective video frames that corresponds with various facial expressions, head movements and/or body movements. For example, the Avatar Engine may identify one or more video frames in the video stream that includes various pixels and/or pixel regions that portray a human head nodding in the affirmative (i.e. nodding "yes") and/or laughing. The Avatar Engine identifies audio data related to the respective video frames and determines timestamps for the audio data. The Avatar Engine identifies one or more blendshapes for the mesh model that represent an affirmative head nod and/or laughing. The Avatar Engine generates commands 524 based on the audio data timestamps and the identified blendshapes.

Figure 6A:
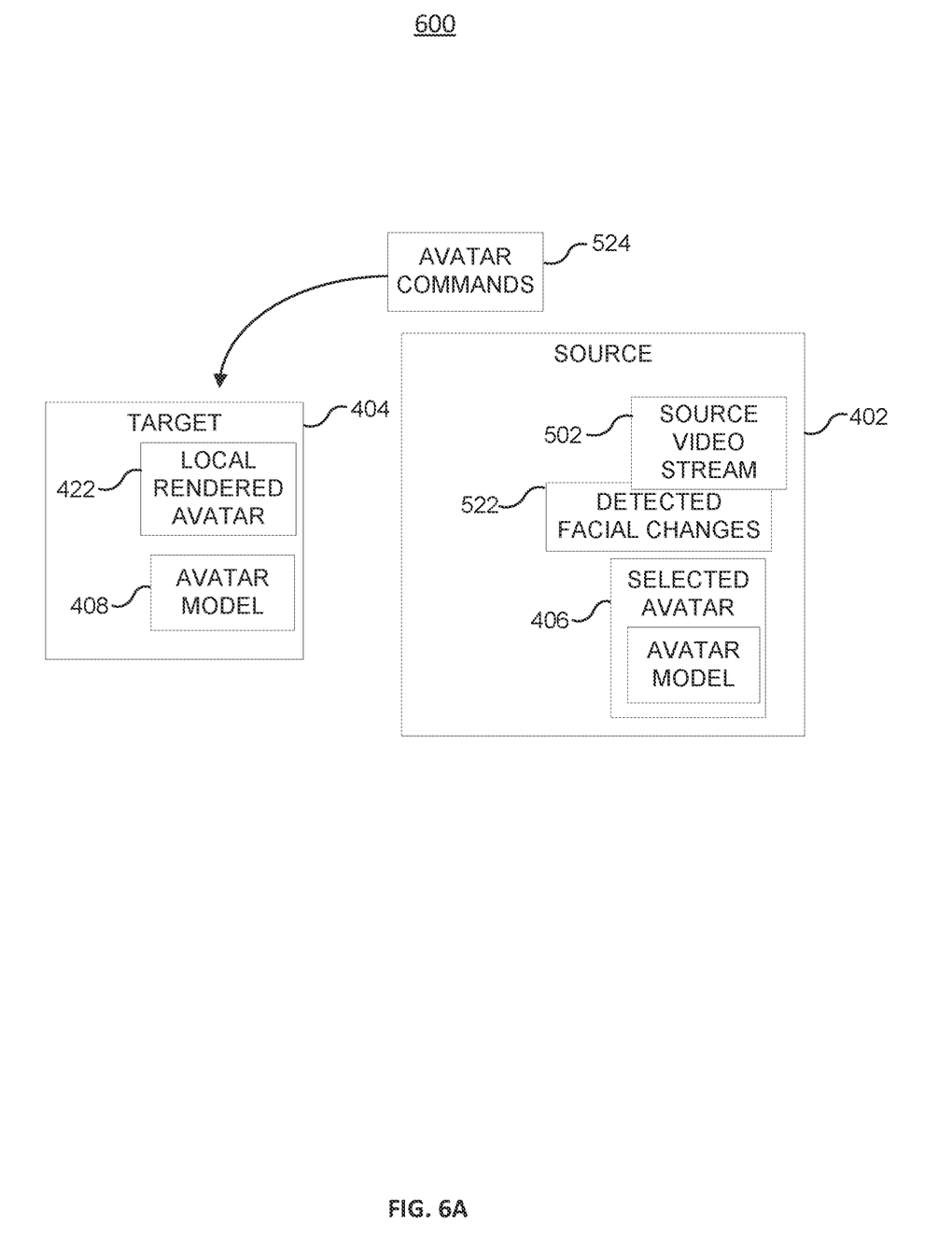
FIGS. 6A and 6B are each a diagram illustrating an exemplary environment in which some embodiments may operate.

As shown in diagram 600 of the example of FIG. 6A, the Avatar Engine triggers transmission of the commands 524 to the target computer device 404. As shown in diagram 620 of the example of FIG. 6B, the target computer device 404 receives the commands 524 while the first user account and the second user account are participating in the online virtual meeting. The Avatar Engine may be currently displaying a local rendering of the digital avatar 422 at the target computer device 404 as the target computer device 404 receives the commands 524 (and continually receives subsequent commands) from the source computer device 402. The Avatar Engine applies the commands 524 to the locally stored mesh model 408 (i.e. avatar model 408) to update the display of the local rendering of the digital avatar 622. For example, the target computer device 404 applies the commands to the locally stored mesh model 408. As such, the updated local rendering of the digital avatar 622 displays the digital avatar at the target computer device 404 as performing the detected changes 522 in the video stream 502 at the source computer device 402. For example, the updated local rendering of the digital avatar 622 is generated and displayed at the target computer device 404 as performing the affirmative head nod and/or laughing as detected in the video stream 502 at the source computer device 402.

In some embodiments, one or more pre-defined commands may be generated prior to an online virtual meeting. A respective pre-defined command represents a selectable digital avatar modification(s) that may be rendered via the mesh model 406 independent from detected changes in the video stream 502. For example, a pre-defined command may represent, for example, one or more blendshapes for display of an eye wink, an eye roll, eyes closed, cheek blushing, etc. via a rendering of the digital avatar. The second user account associated with source computer device 402 may select a pre-defined command during an online virtual meeting.

The Avatar Engine receives selection of the pre-defined command while concurrently capturing the video stream 502 at the source computer device 402. As the Avatar Engine detects changes 522 in the video stream 502, the Avatar Engine determines an audio data timestamp for the selected pre-defined command. The Avatar Engine triggers transmission of the selected pre-defined command to the target computer device 404 in chronological order of audio data timestamps of other respective commands 524 being sent to the target computer device 404.

The target computer device 404 receives the pre-defined command and applies the pre-defined command to the locally stored mesh model 408. The target computer device 404 applies the pre-defined command and other received commands 524 in chronological order according to respective audio data timestamps. In some embodiments, the pre-defined command and one or more of the commands 524 may have the same audio data timestamps. The Avatar Engine thereby concurrently applies the pre-defined command and those one or more of the commands 524 to the locally stored mesh model 408.

Figure 6B:
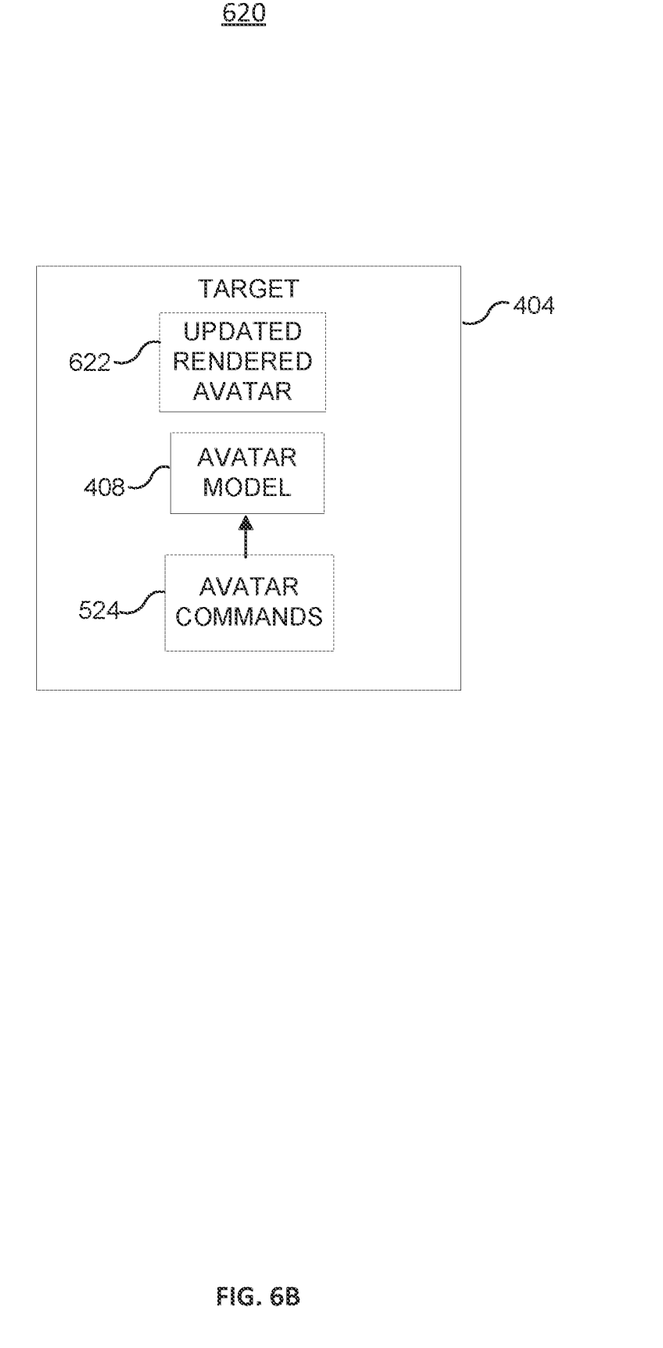

In some embodiments, the audio data related to the respective video frames may be sent to a cloud computing resource (such as, for example, a multimedia router) whereas the commands 524 may be sent by the Avatar Engine directly from the source computer device 402 to the target computer device 404. The commands 524 include the audio data timestamps. The target computer device 404 receives the audio data from the cloud computing resource and the commands 524 from the source computer device 402. The target computer device 404 applies the commands 524 to the locally stored the mesh model 408 with respect to the audio data such that the updated local rendering of the digital avatar 622 is displayed in synchronization with the playback of the audio data in the online virtual meeting.

According to various embodiments, the target computer device 408 generates from the instance 408 of the mesh model 406, an animated digital representation of the second user account. The mesh model 406 may be a mesh-based 3D model. In some embodiments, a separate avatar head mesh model and a separate body mesh model may be used. The 3D head mesh model may be rigged to use different blendshapes for natural expressions. In one embodiment, the 3D head mesh model may be rigged to use and/or combine any number of different blendshapes. The blendshapes may be used to deform facial expressions. Blendshape deformers may be used in the generation of the digital representation. For example, blendshapes may be used to interpolate between two shapes made from the same numerical vertex order. This allows a mesh to be deformed and stored in a number of different positions at once.

Different types of 3D mesh-based models may be used by the Avatar Engine In some embodiments, a 3D mesh-based model may be based on three-dimensional facial expression (3DFE) models. In some embodiments, the mesh model 406 may be based on a Facial Action Coding System (FACS) coded blendshapes for facial expressions and optionally other blendshapes for tongue out expressions. In some embodiments, the mesh model 406 may be a 3D morphable model (3DMM) utilized to generate rigged avatar models.

In some embodiments, the Avatar Engine may receive multiple scans via software-based image processing to generate a personalized 3D mesh model that corresponds to that individual's user account. For example, the Avatar Engine creates an image dataset with multiple scans of images (e.g., approximately 300 scans). Each scan may be represented as a shape vector. Some unsymmetric registrations out of the scans may be selected due to inaccurate 3D landmarks, which are then deformed for symmetric shapes. The system 100, for example, may generate approximately 230 high quality meshes. A customized mesh of a user may then be packaged with associated bendshapes, and the electronic package transmitted to the target computer device 404.

Figure 7:
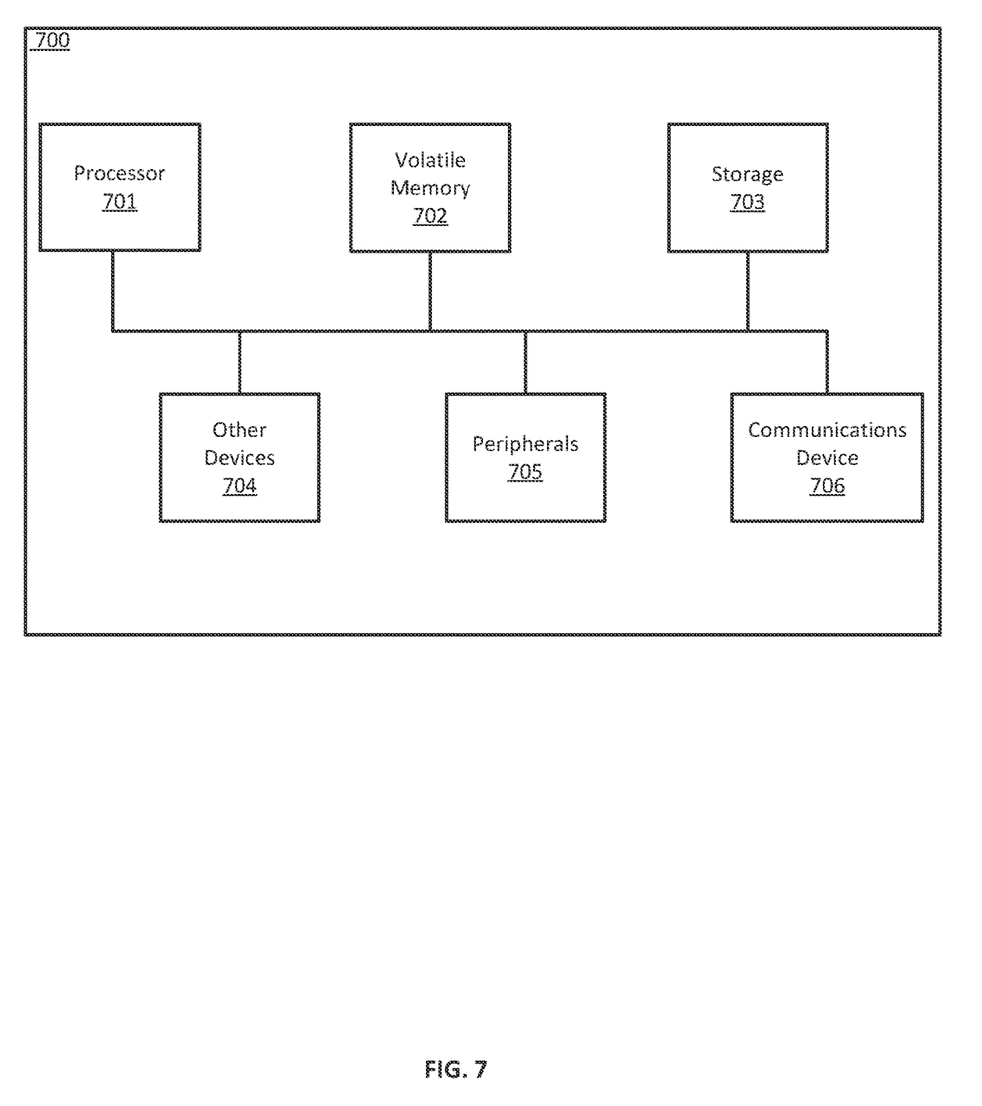
FIG. 7 is a diagram illustrating an exemplary environment in which some embodiments may operate.

FIG. 7 is a diagram illustrating an exemplary computer that may perform processing in some embodiments. As shown in the example of FIG. 7, an exemplary computer 700 may perform operations consistent with some embodiments. The architecture of computer 700 is exemplary. Computers can be implemented in a variety of other ways. A wide variety of computers can be used in accordance with the embodiments herein.

Processor 701 may perform computing functions such as running computer programs. The volatile memory 702 may provide temporary storage of data for the processor 701. RAM is one kind of volatile memory. Volatile memory typically requires power to maintain its stored information. Storage 703 provides computer storage for data, instructions, and/or arbitrary information. Non-volatile memory, which can preserve data even when not powered and including disks and flash memory, is an example of storage.

Storage 703 may be organized as a file system, database, or in other ways. Data, instructions, and information may be loaded from storage 703 into volatile memory 702 for processing by the processor?.

The computer 700 may include peripherals 705. Peripherals 705 may include input peripherals such as a keyboard, mouse, trackball, video camera, microphone, and other input devices. Peripherals 705 may also include output devices such as a display. Peripherals 705 may include removable media devices such as CD-Rand DV D-R recorders/players. Communications device 706 may connect the computer 700 to an external medium. For example, communications device 706 may take the form of a network adapter that provides communications to a network. A computer 700 may also include a variety of other devices 704. The various components of the computer 700 may be connected by a connection medium such as a bus, crossbar, or network.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computer device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general-purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

It will be appreciated that the present disclosure may include any one and up to all of the following examples.

Example 1. A computer-implemented method comprising: triggering transmission of an instance of a three-dimensional (3D) mesh model to a target computer device associated with a first user account; detecting one or more changes in a video stream captured at a source computer device associated with a second user account, the second user account represented by a digital avatar rendered at the target computer device according to the instance of the 3D mesh model received by the target computer device; identifying at least one command based on the one or more detected changes in the video stream captured at the source computer device, the at least one command corresponding to at least a portion of one or more blendshapes; and triggering transmission of the identified command to the target computer device associated with the first user account, the target computer device generating a local instantiation of the digital avatar rendered according to the 3D mesh model and the one or more blendshapes.

Example 2: The method of Example 1, identifying one or more portions of an audio stream associated with one or more image frames that portray the one or more detected changes in the video stream; generating a command timestamp for the identified command based on the one or [0060] more identified portions of the audio stream; and wherein triggering transmission of the identified command to the target computer device further includes: triggering transmission of the command timestamp to the target computer device.

Example 3: The method of any Examples 1-2, further comprising: wherein triggering transmission of an instance of a 3D mesh model comprises: triggering transmission of the instance of the 3D mesh model to the target computer device based on an action by the first user account with respect to an online virtual meeting.

Example 4: The method of any Examples 1-3, further comprising: triggering transmission of the instance of the 3D mesh model based on detecting an accept action by the first user account, the accept action representing the first user account accepting an invitation to the online virtual meeting.

Example 5: The method of any Examples 1-4, further comprising: triggering transmission of the instance of the 3D mesh model based on detecting a request action by the first user account, the requesting action representing the first user account requesting to access the online virtual meeting.

Example 6: The method of any Examples 1-5, further comprising: wherein triggering transmission of an instance of a 3D mesh model comprises: triggering transmission from one of: a cloud-based multimedia transmission module or the source computer device.

Example 7: The method of any Examples 1-6, further comprising: wherein triggering transmission of an instance of a 3D mesh model comprises: triggering transmission in response to detecting a disruption of capturing the video stream at the source computer device.

Example 8: The method of any Examples 1-7, further comprising: wherein triggering transmission of an instance of a 3D mesh model comprises: triggering transmission in response to detecting a disruption of presenting the video stream at the target source computer device.

Example 9: The method of any Examples 1-8 further comprising: wherein triggering transmission of the identified command to the target computer device comprises: receiving an identification of a pre-defined command selected by the second user account represented by the digital avatar, the pre-defined command representing one or more blendshapes independent from the video stream; and triggering transmission of the pre-defined command to the target computer device.

Example 10: A non-transitory computer-readable medium having a computer-readable program code embodied therein to be executed by one or more processors, the program code including instructions for: triggering transmission of an instance of a 3D mesh model to a target computer device associated with a first user account; detecting one or more changes in a video stream captured at a source computer device associated with a second user account, the second user account represented by a digital avatar rendered at the target computer device according to the instance of the 3D mesh model received by the target computer device; identifying at least one command based on the one or more detected changes in the video stream captured at the source computer device, the at least one command corresponding to at least a portion of one or more blendshapes; and triggering transmission of the identified command to the target computer device associated with the first user account, the target computer device generating a local instantiation of the digital avatar rendered according to the 3D mesh model and the one or more blendshapes.

Example 11: The non-transitory computer-readable medium of any Examples 10, further comprising: identifying one or more portions of an audio stream associated with one or more image frames that portray the one or more detected changes in the video stream; generating a command timestamp for the identified command based on the one or more identified portions of the audio stream; and wherein triggering transmission of the identified command to the target computer device further includes: triggering transmission of the command timestamp to the target computer device.

Example 12: The non-transitory computer-readable medium of any Examples 10-11, further comprising: wherein triggering transmission of an instance of a 3D mesh model comprises: triggering transmission of the instance of the 3D mesh model to the target computer device based on an action by the first user account with respect to an online virtual meeting.

Example 13: The non-transitory computer-readable medium of any Examples 10-12, further comprising: triggering transmission of the instance of the 3D mesh model based on detecting an accept action by the first user account, the accept action representing the first user account accepting an invitation to the online virtual meeting.

Example 14: The non-transitory computer-readable medium of any Examples 10-13, further comprising: triggering transmission of the instance of the 3D mesh model based on detecting a request action by the first user account, the requesting action representing the first user account requesting to access the online virtual meeting.

Example 15: The non-transitory computer-readable medium of any Examples 10-14, further comprising: wherein triggering transmission of an instance of a 3D mesh model comprises: triggering transmission from one of: a cloud-based multimedia router or the source computer device.

Example 16: The non-transitory computer-readable medium of any Examples 10-15, wherein triggering transmission of an instance of a 3D mesh model comprises: triggering transmission in response to detecting a disruption of capturing the video stream at the source computer device.

Example 17: The non-transitory computer-readable medium of any Examples 10-16, wherein triggering transmission of an instance of a 3D mesh model comprises: triggering transmission in response to detecting a disruption of presenting the video stream at the target source computer device.

Example 18: The non-transitory computer-readable medium of any Examples 10-17, wherein triggering transmission of the identified command to the target computer device comprises: receiving an identification of a pre-defined command selected by the second user account represented by the digital avatar, the pre-defined command representing one or more blendshapes independent from the video stream and created prior to capture of the video stream; and triggering transmission of the pre-defined command to the target computer device.

Example 19: A communication system comprising one or more processors configured to perform the operations of: triggering transmission of an instance of a 3D mesh model to a target computer device associated with a first user account; detecting one or more changes in a video stream captured at a source computer device associated with a second user account, the second user account represented by a digital avatar rendered at the target computer device according to the instance of the 3D mesh model received by the target computer device; identifying at least one command based on the one or more detected changes in the video stream captured at the source computer device, the at least one command corresponding to at least a portion of one or more blendshapes; and triggering transmission of the identified command to the target computer device associated with the first user account, the target computer device generating a local instantiation of the digital avatar rendered according to the 3D mesh model and the one or more blendshapes.

Example 20: The communication system of any Examples 19-20, further comprising: identifying one or more portions of an audio stream associated with one or more image frames that portray the one or more detected changes in the video stream; generating a command timestamp for the identified command based on the one or more identified portions of the audio stream; receiving an identification of a pre-defined command selected by the second user account represented by the digital avatar, the pre-defined command representing one or more blendshapes independent from the video stream and created prior to capture of the video stream; wherein triggering transmission of the identified command to the target computer device further includes: triggering transmission of the command timestamp and the selected pre-defined command to the target computer device.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A computer-implemented method comprising:
   triggering transmission of an instance of a three-dimensional (3D) mesh model to a target computer device associated with a first user account;
   detecting one or more changes in a video stream captured at a source computer device associated with a second user account, the second user account represented by a digital rendering at the target computer device according to the instance of the 3D mesh model received by the target computer device;
   identifying at least one command based on the one or more detected changes in the video stream captured at the source computer device, the at least one command corresponding to at least a portion of one or more blendshapes;
   identifying one or more portions of an audio stream associated with one or more image frames that portray the one or more detected changes in the video stream;
   generating a command timestamp for the at least one identified command based on the one or more identified portions of the audio stream; and
   triggering transmission of the identified command to the target computer device associated with the first user account, the target computer device generating a local instantiation of the digital rendering according to the 3D mesh model and the one or more blendshapes.

2. The computer-implemented method of claim 1,
   wherein triggering transmission of the identified command to the target computer device further includes:
   triggering transmission of the command timestamp to the target computer device.

3. The computer-implemented method of claim 1, wherein triggering transmission of an instance of a 3D mesh model comprises:
   triggering transmission of the instance of the 3D mesh model to the target computer device based on an action by the first user account with respect to an online virtual meeting.

4. The computer-implemented method of claim 3, further comprising:
   triggering transmission of the instance of the 3D mesh model based on detecting an accept action by the first user account, the accept action representing the first user account accepting an invitation to the online virtual meeting.

5. The computer-implemented method of claim 3, further comprising:
   triggering transmission of the instance of the 3D mesh model based on detecting a request action by the first user account, the requesting action representing the first user account requesting to access the online virtual meeting.

6. The computer-implemented method of claim 1, wherein triggering transmission of an instance of a 3D mesh model comprises:
   triggering transmission from one of: a cloud-based multimedia transmission module or the source computer device.

7. The computer-implemented method of claim 1, wherein triggering transmission of an instance of a 3D mesh model comprises:
   triggering transmission in response to detecting a disruption of capturing the video stream at the source computer device.

8. The computer-implemented method of claim 1, wherein triggering transmission of an instance of a 3D mesh model comprises:
   triggering transmission in response to detecting a disruption of presenting the video stream at the target computer device.

9. The computer-implemented method of claim 1, wherein triggering transmission of the identified command to the target computer device comprises:
   receiving an identification of a pre-defined command selected by the second user account represented by the digital rendering, the pre-defined command representing one or more blendshapes independent from the video stream; and
   triggering transmission of the pre-defined command to the target computer device.

10. A non-transitory computer-readable medium having a computer-readable program code embodied therein to be executed by one or more processors, the program code including instructions for:
    triggering transmission of an instance of a 3D mesh model to a target computer device associated with a first user account;
    detecting one or more changes in a video stream captured at a source computer device associated with a second user account, the second user account represented by a digital rendering at the target computer device according to the instance of the 3D mesh model received by the target computer device;
    identifying at least one command based on the one or more detected changes in the video stream captured at the source computer device, the at least one command corresponding to at least a portion of one or more blendshapes;
    identifying one or more portions of an audio stream associated with one or more image frames that portray the one or more detected changes in the video stream;
    generating a command timestamp for the at least one identified command based on the one or more identified portions of the audio stream; and
    triggering transmission of the identified command to the target computer device associated with the first user account, the target computer device generating a local instantiation of the digital rendering according to the 3D mesh model and the one or more blendshapes.

11. The non-transitory computer-readable medium of claim 10,
    wherein triggering transmission of the identified command to the target computer device further includes:
    triggering transmission of the command timestamp to the target computer device.

12. The non-transitory computer-readable medium of claim 10, wherein triggering transmission of an instance of a 3D mesh model comprises:
    triggering transmission of the instance of the 3D mesh model to the target computer device based on an action by the first user account with respect to an online virtual meeting.

13. The non-transitory computer-readable medium of claim 12, further comprising:
- triggering transmission of the instance of the 3D mesh model based on detecting an accept action by the first user account, the accept action representing the first user account accepting an invitation to the online virtual meeting.

14. The non-transitory computer-readable medium of claim 12, further comprising:
- triggering transmission of the instance of the 3D mesh model based on detecting a request action by the first user account, the requesting action representing the first user account requesting to access the online virtual meeting.

15. The non-transitory computer-readable medium of claim 10, wherein triggering transmission of an instance of a 3D mesh model comprises:
- triggering transmission from one of: a cloud-based multimedia router or the source computer device.

16. The non-transitory computer-readable medium of claim 10, wherein triggering transmission of an instance of a 3D mesh model comprises:
- triggering transmission in response to detecting a disruption of capturing the video stream at the source computer device.

17. The non-transitory computer-readable medium of claim 10, wherein triggering transmission of an instance of a 3D mesh model comprises:
- triggering transmission in response to detecting a disruption of presenting the video stream at the target computer device.

18. The non-transitory computer-readable medium of claim 10, wherein triggering transmission of the identified command to the target computer device comprises:
- receiving an identification of a pre-defined command selected by the second user account represented by the digital rendering, the pre-defined command representing one or more blendshapes independent from the video stream and created prior to capture of the video stream; and
- triggering transmission of the pre-defined command to the target computer device.

19. A communication system comprising:
one or more processors configured to:
- trigger transmission of an instance of a 3D mesh model to a target computer device associated with a first user account;
- detect one or more changes in a video stream captured at a source computer device associated with a second user account, the second user account represented by a digital rendering at the target computer device according to the instance of the 3D mesh model received by the target computer device;
- identify at least one command based on the one or more detected changes in the video stream captured at the source computer device, the at least one command corresponding to at least a portion of one or more blendshapes;
- identify one or more portions of an audio stream associated with one or more image frames that portray the one or more detected changes in the video stream;
- generate a command timestamp for the at least one identified command based on the one or more identified portions of the audio stream; and
- trigger transmission of the identified command to the target computer device associated with the first user account, the target computer device generating a local instantiation of the digital rendering according to the 3D mesh model and the one or more blendshapes.

20. The communication system of claim 19, wherein the one or more processors are further configured to:
- receive an identification of a pre-defined command selected by the second user account represented by the digital rendering, the pre-defined command representing one or more blendshapes independent from the video stream and created prior to capture of the video stream; and
- trigger transmission of the command timestamp and the selected pre-defined command to the target computer device.

* * * * *